UNITED STATES PATENT OFFICE.

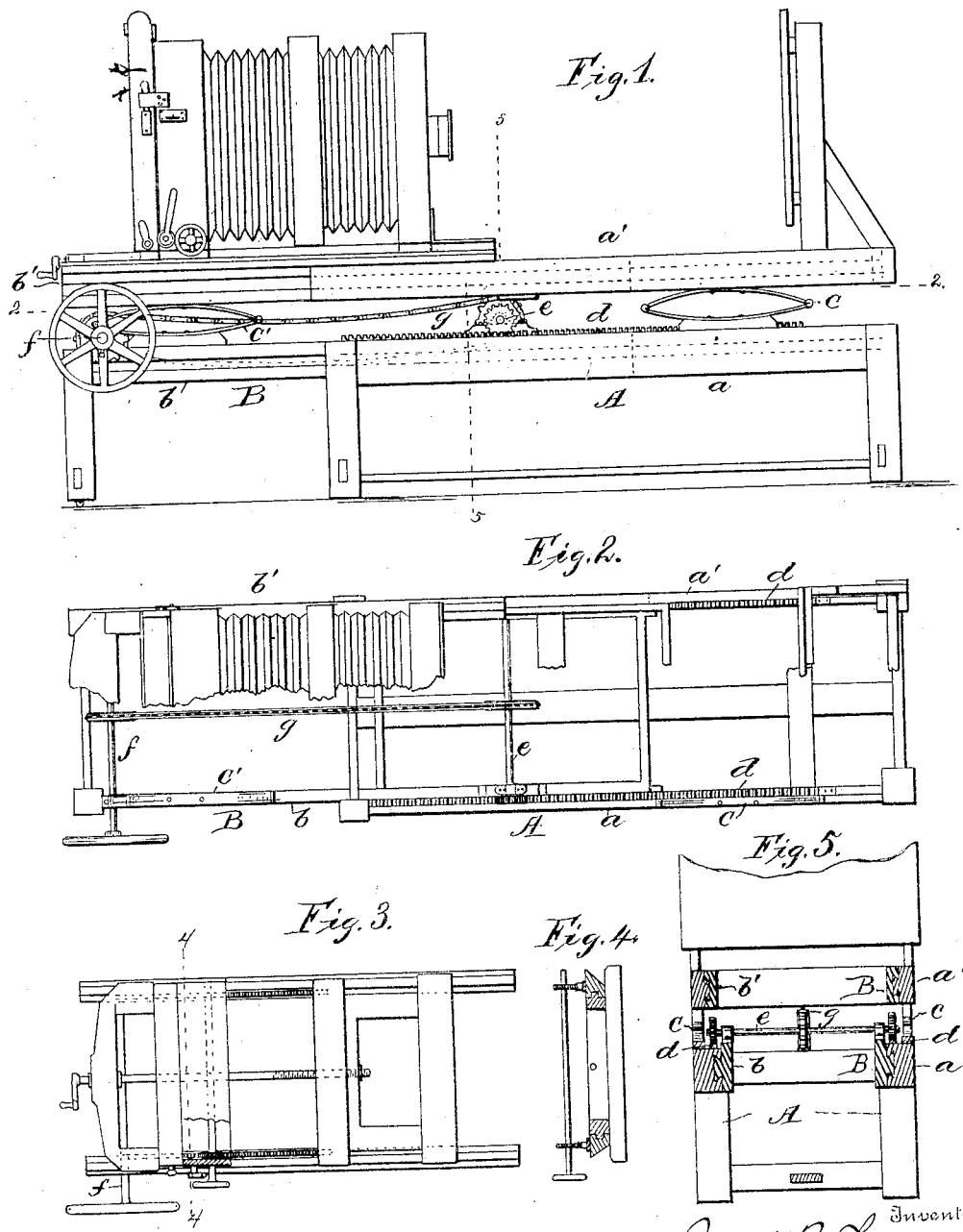

JOSEPH B. LEVY, OF PHILADELPHIA, PENNSYLVANIA.

CAMERA-STAND.

No. 798,353.  Specification of Letters Patent.  Patented Aug. 29, 1905.

Application filed December 6, 1904. Serial No. 235,700.

*To all whom it may concern:*

Be it known that I, JOSEPH B. LEVY, a citizen of the United States, residing at Philadelphia, in the county of Philadelphia and State of Pennsylvania, have invented certain new and useful Improvements in Camera-Stands, of which the following is a specification.

This invention relates to stands for photographic cameras such as are used for copying in photo-mechanical work; and the invention consists in the construction and combination of the parts, as will be hereinafter set forth.

In the accompanying drawings, Figure 1 is a side view of a camera-stand made in accord with my invention, the camera and copy-holder being shown thereon. Fig. 2 is a combined plan and sectional view, the section being on the line 2 2 of Fig. 1. Fig. 3 is a plan view of the support for the camera. Fig. 4 is a section on the line 4 4 of Fig. 3, and Fig. 5 is a vertical section on the line 5 5 of Fig. 1.

A refers to one of the sections of a base which is supported upon legs and is braced to provide a rigid structure having parallel side bars $a\ a$, with which the side bars $b\ b$ of a movable section B engage. The section B is provided at its rear end with legs having rollers or casters, the side bars of the sections being held in sliding engagement one with the other. The base-frame, made up of the sections A and B, is connected to parallel side pieces $a'$ and $b'$, which are held in sliding engagement with each other by elliptic springs $c$ and $c'$, such springs constituting the connecting means between the lower and upper sections of the fixed and the sliding frames. The camera and the copy-holder are secured to the upper frames, and the interposed springs $c\ c'$ prevent vibrations being transmitted from the floor to the upper sections of the frame.

To provide for a quick and easy adjustment of the frame B to and from the frame A, the side bars $a\ a$ have secured thereto racks $d\ d$, and the bars $b\ b$ of the movable frame B have journaled thereto shafts $e$ and $f$, the shaft $e$ having pinions which mesh with the racks $d\ d$. The shafts $e$ and $f$ are in gear with each other, each shaft having thereon a sprocket-wheel about which passes a chain $g$, so that when the hand-wheel on the end of the shaft $f$ is turned the frame B, to which the camera is connected, will be moved to or from the frame A, which has thereon the copy-holder.

The construction shown and described may be varied without departing from the invention, and a camera-stand having my improvements incorporated therein obviates the difficulty arising from the camera, in approaching or receding to and from the copy-holder, having to move along the surface of the camera-table, thus rendering it necessary for the operator to lean over the side of the table and crane his neck while focusing on the ground glass of the camera. With a camera-table of my construction the operator can always work at the rear end of the table with the ground glass directly and straight before him, and when the camera is not in use the frame can be moved or telescoped so that the entire structure will occupy less longitudinal space than a non-extensible stand. It will be particularly noted that there are no rigid connections between the upper and lower sections of the frames, the springs not only serving to relieve the camera and the copy-holder from the effects of vibrations, but also form a practical means for connecting the side bars of the upper and lower frames.

I claim—

1. A camera-stand, comprising a base made up of two sections maintained in sliding engagement with each other, means for moving one of the sections to or from the other section, spring-supported frames attached to the base-sections and movable in unison therewith.

2. A camera-stand, comprising a rigid base and a sliding section which engages therewith, means carried by the sliding section for moving the same to and from the fixed section which includes two connected shafts, pinions on one of the shafts, and rack-bars on the fixed frame with which the pinions engage, spring-supported frames connected to the base and to the sliding section, a camera mounted on the sliding frame and a copy-holder attached to the fixed frame.

3. A camera-stand, comprising a base, springs, rack-bars and a copy-holding frame attached thereto, a movable section in telescopic engagement with the base, shafts journaled upon the movable section and in operative engagement with each other, pinions on one of the shafts to engage the racks on the
5 fixed frame, and a camera mounted on the movable section, for the purpose set forth.

In testimony whereof I have signed my name to this specification in the presence of two subscribing witnesses.

JOSEPH B. LEVY.

Witnesses:
   JOSEPH F. ENGLERT,
   FREDK. C. EBERHARDT.